United States Patent

Demko

[11] Patent Number: 6,054,919
[45] Date of Patent: Apr. 25, 2000

[54] ADVANCED BRAKING LIGHT SYSTEM

[76] Inventor: Paul S. Demko, 75 Springfield Gardens, Upminister, Essex, United Kingdom, UK RM14 3ER

[21] Appl. No.: 09/116,974

[22] Filed: Jul. 16, 1998

[51] Int. Cl.[7] .................................................. B60Q 1/44
[52] U.S. Cl. ...................... 340/479; 340/463; 340/467; 200/61.89
[58] Field of Search ................................... 340/463, 464, 340/466, 467, 468, 479; 200/61.89, 538, 541, 542

[56] References Cited

U.S. PATENT DOCUMENTS

| | | | |
|---|---|---|---|
| 4,918,424 | 4/1990 | Sykora | 340/464 |
| 5,150,098 | 9/1992 | Rakow | 340/479 |
| 5,387,898 | 2/1995 | Yeheskel et al. | 340/479 |

*Primary Examiner*—Daryl Pope

[57] ABSTRACT

A variable brake light system is provided including a plurality of brake lights situated on a rear of the vehicle. Each brake light has a unique size. A plunger mechanism is included for actuating the brake lights. In operation, lights of increasing size are illuminated as a brake pedal is increasingly depressed.

7 Claims, 3 Drawing Sheets

ADVANCED BRAKING LIGHT SYSTEM

BACKGROUND OF THE INVENTION

1. Field of the Invention

The present invention relates to brake light systems and more particularly pertains to a new advanced braking light system for providing an indication of an extent to which a driver is braking.

2. Description of the Prior Art

The use of brake light systems is known in the prior art. More specifically, brake light systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art brake light systems include U.S. Pat. No. 4,107,647; U.S. Pat. No. 4,800,377; U.S. Pat. No. 5,148,147; U.S. Pat. No. 4,097,842; U.S. Pat. No. 4,990,886; and U.S. Pat. Des. 293,479, which are all incorporated herein by reference.

In these respects, the advanced braking light system according to the present invention substantially departs from the conventional concepts and designs of the prior art, and in so doing provides an apparatus primarily developed for the purpose of providing an indication of an extent to which a driver is braking.

SUMMARY OF THE INVENTION

In view of the foregoing disadvantages inherent in the known types of brake light systems now present in the prior art, the present invention provides a new advanced braking light system construction wherein the same can be utilized for providing an indication of an extent to which a driver is braking.

The general purpose of the present invention, which will be described subsequently in greater detail, is to provide a new advanced braking light system apparatus and method which has many of the advantages of the brake light systems mentioned heretofore and many novel features that result in a new advanced braking light system which is not anticipated, rendered obvious, suggested, or even implied by any of the prior art brake light systems, either alone or in any combination thereof.

To attain this, the present invention generally comprises a housing with a cylindrical configuration having an inboard face, an outboard face and a tubular periphery defining an interior space. The inboard face of the housing is mounted in an engine compartment below a conventional brake pedal. The outboard face has an aperture formed therein with a tubular sleeve mounted thereon in concentric relationship therewith and extending therefrom. Mounted on the inboard face of the housing is a conductive coil spring situated within the interior space thereof. The coil spring is electrically connected to a power source. Two sets of linearly aligned contacts are mounted on diametrically opposed sides of the tubular periphery of the housing within the interior space thereof. Each set of contacts forms a line which remains in parallel with an axis of the housing and further extends along a length thereof. Each contact includes a spring biased ball bearing, as shown in FIG. 2. As shown in FIG. 1, a plurality of pairs of brake lights are situated on a rear of the vehicle. Each pair of brake lights has a unique size and intensity and are connected to an associated pair of diametrically contacts of the sets of contacts. It should be noted that a size and intensity of the brake lights connected to contacts closer to the inboard face of the housing are less than that of the brake lights connected to contacts closer to the outboard face of the housing. Finally, a conductive plunger having a cylindrical configuration is slidably situated within the interior space of the housing. Such plunger abuts the coil spring for receiving power therefrom. The plunger has a rod mounted to an outboard end thereof. The rod extends through the aperture of the outboard face of the housing for communicating with the brake pedal. By this structure, the pairs of lights of increasing size and intensity are illuminated as the pedal is increasingly depressed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new advanced braking light system apparatus and method which has many of the advantages of the brake light systems mentioned heretofore and many novel features that result in a new advanced braking light system which is not anticipated, rendered obvious, suggested, or even implied by any of the prior art brake light systems, either alone or in any combination thereof.

It is another object of the present invention to provide a new advanced braking light system which may be easily and efficiently manufactured and marketed.

It is a further object of the present invention to provide a new advanced braking light system which is of a durable and reliable construction.

An even further object of the present invention is to provide a new advanced braking light system which is susceptible of a low cost of manufacture with regard to both materials and labor, and which accordingly is then susceptible of low prices of sale to the consuming public, thereby making such advanced braking light system economically available to the buying public.

Still yet another object of the present invention is to provide a new advanced braking light system which provides in the apparatuses and methods of the prior art some of the advantages thereof, while simultaneously overcoming some of the disadvantages normally associated therewith.

Still another object of the present invention is to provide a new advanced braking light system for providing an indication of an extent to which a driver is braking.

Even still another object of the present invention is to provide a new advanced braking light system that includes a plurality of brake lights situated on a rear of the vehicle. Each brake light has a unique size. A plunger mechanism is included for actuating the brake lights. In operation, lights of increasing size are illuminated as a brake pedal is increasingly depressed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
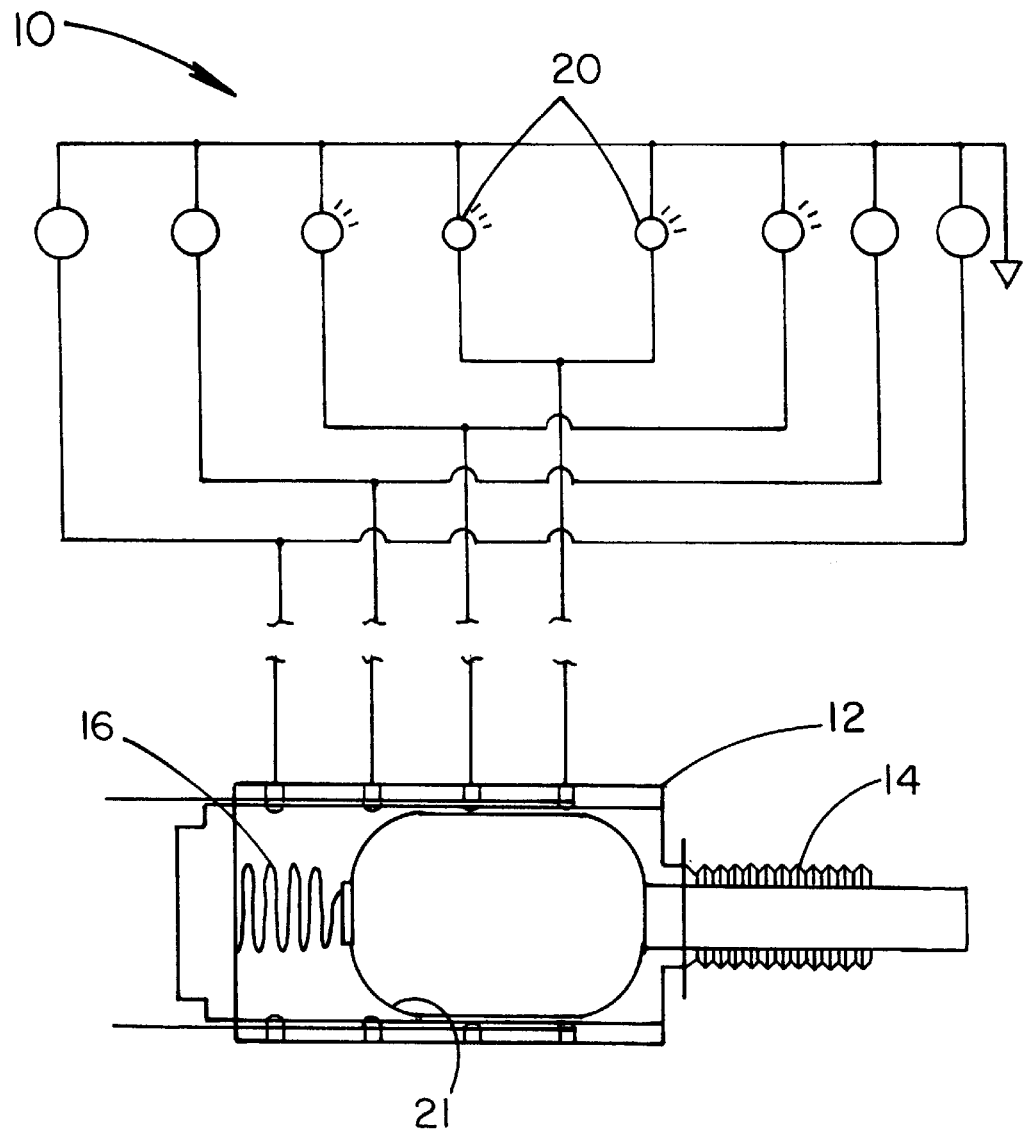
FIG. 1 is a schematic diagram of a new advanced braking light system according to the present invention.

With reference now to the drawings, and in particular to FIGS. 1 through 5 thereof, a new advanced braking light system embodying the principles and concepts of the present invention and generally designated by the reference numeral 10 will be described.

The present invention, designated as numeral 10, includes a housing 12 with a cylindrical configuration having an inboard face, an outboard face and a tubular periphery defining an interior space. The inboard face of the housing is mounted in an engine compartment below a brake pedal of a vehicle. The outboard face has an aperture formed therein with a tubular sleeve 14 mounted thereon in concentric relationship therewith and extending therefrom for reasons that will become apparent hereinafter.

Mounted on the inboard face of the housing is a conductive coil spring 16 which is situated within the interior space of the housing. The coil spring is electrically connected to a power source. As such, it is imperative that the coil spring have a diameter less than that of the housing.

Figure 2:
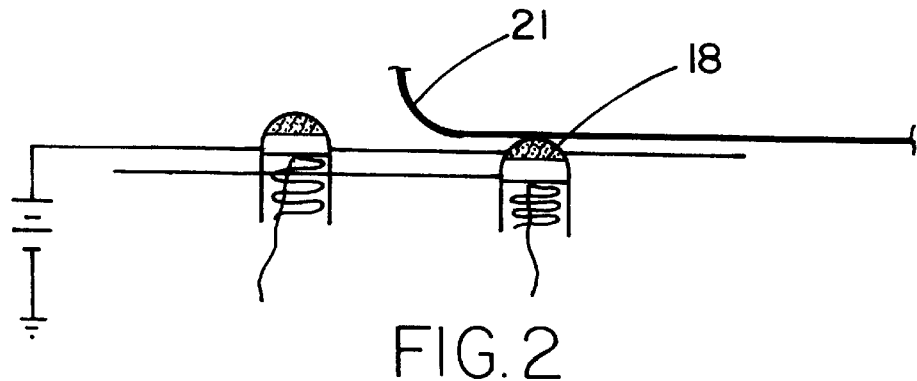
FIG. 2 is a side cross-sectional view of the contacts of the present invention.

Two sets of linearly aligned contacts 18 are mounted on diametrically opposed sides of the tubular periphery of the housing within the interior space thereof. Each set of contacts forms a line which remains in parallel with an axis of the housing and further extends along a length thereof. Each contact includes a spring biased ball bearing, as shown in FIG. 2.

Figure 3:
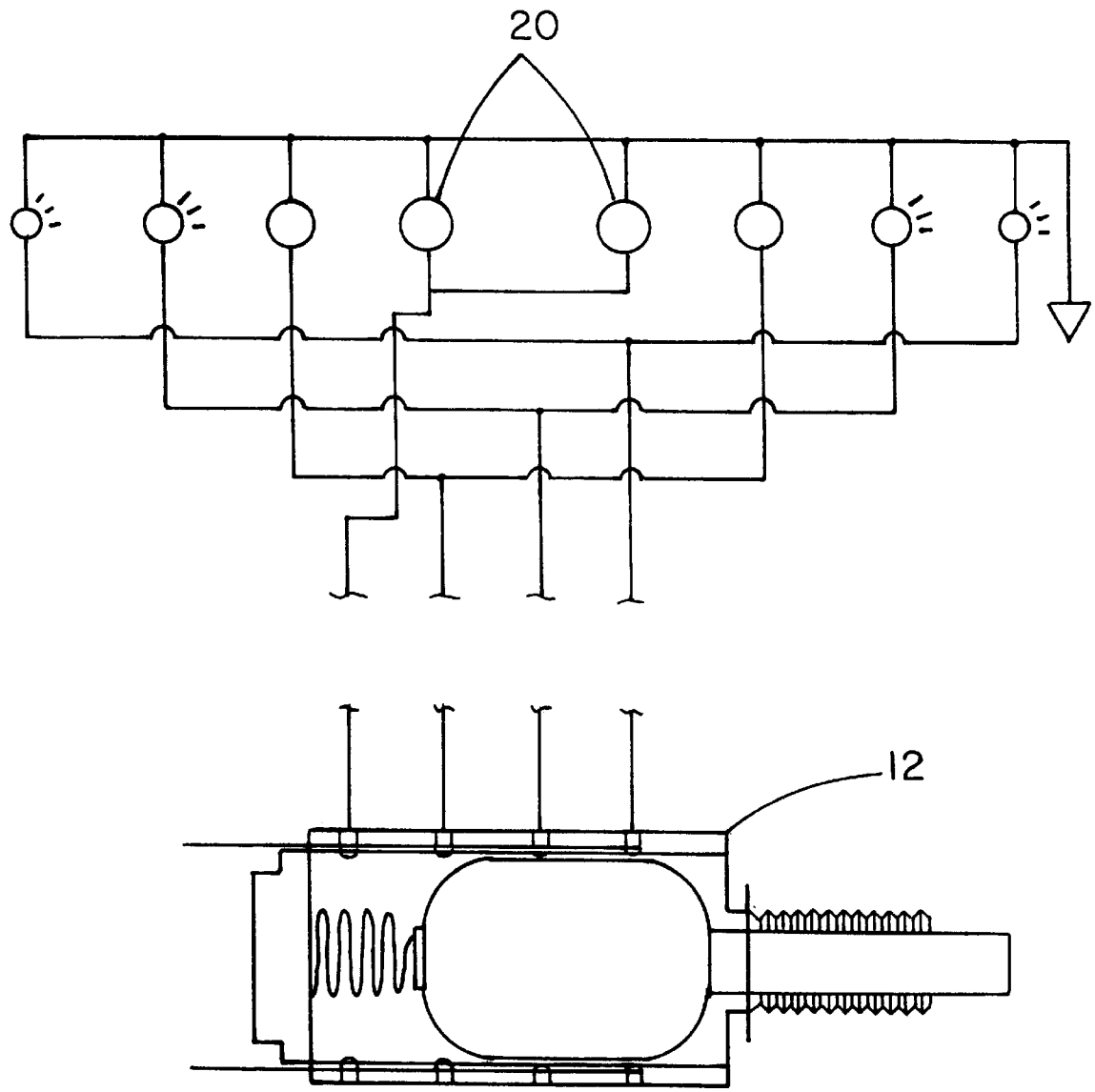
FIG. 3 is a schematic diagram of an alternate embodiment of the present invention.
Figure 4:
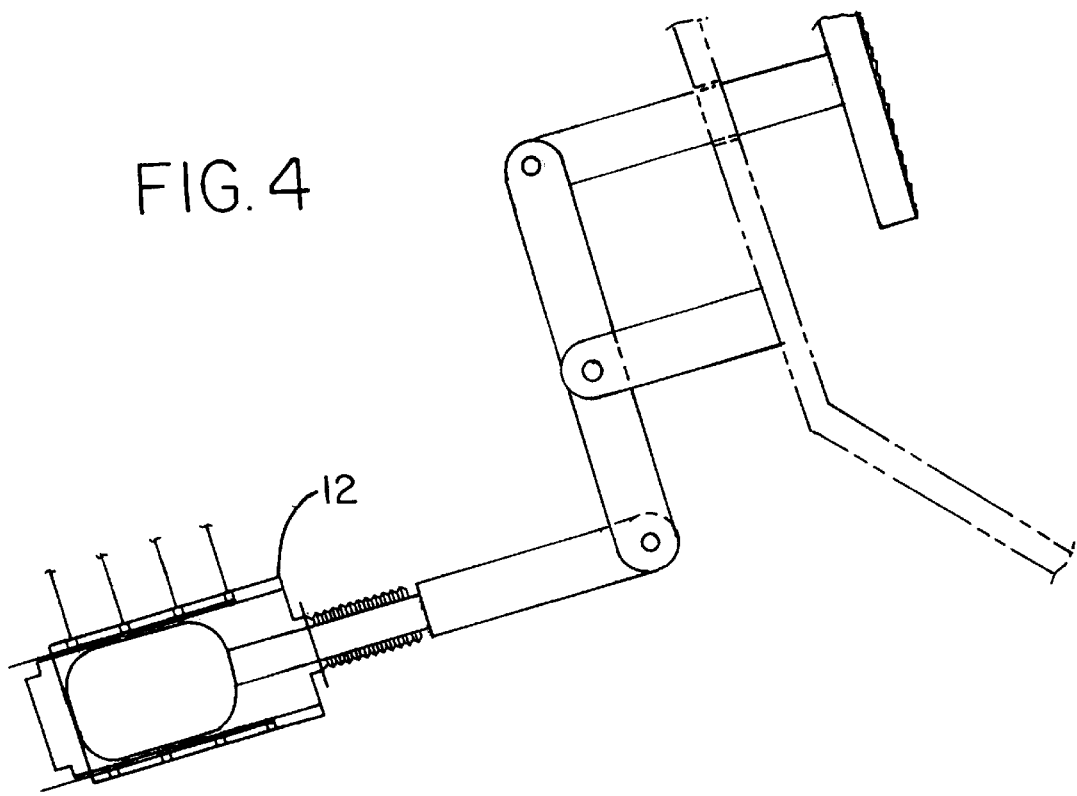
FIGS. 4 & 5 are side views of the present invention during use.
Figure 5:
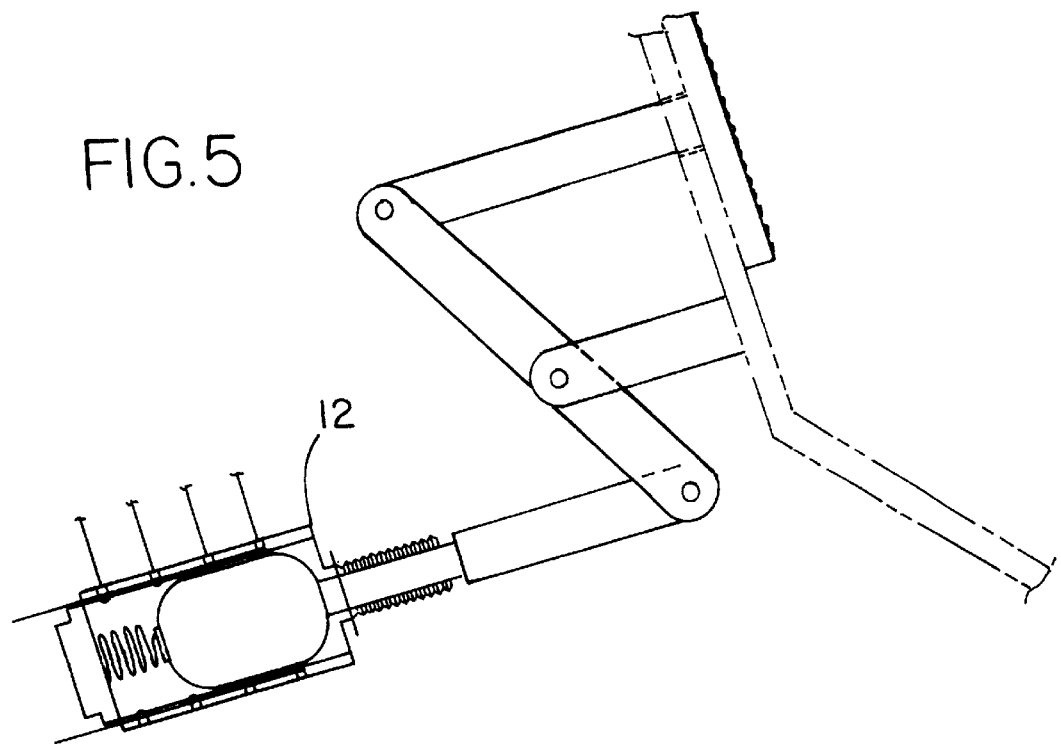

As shown in FIG. 1, a plurality of pairs of brake lights 20 are situated on a rear of the vehicle and further connected in parallel. Each pair of brake lights has a unique size and intensity and is connected to an associated pair of diametrically contacts of the sets of contacts. It should be noted that a size and intensity of the brake lights connected to contacts closer to the inboard face of the housing are less than the brake lights connected to contacts closer to the outboard face of the housing. In the preferred embodiment, the lights are mounted on the rear of the vehicle in linear alignment such that the large lights are situated at the ends. Note FIG. 1. As shown in FIG. 3, the smaller lights may be situated at the ends.

Finally, a conductive plunger 21 having a cylindrical configuration is slidably situated within the interior space of the housing. In the preferred embodiment, the plunger has ends which each define a portion of a sphere. Such plunger abuts the coil spring for receiving power therefrom. The plunger has a rod mounted to an outboard end thereof. The rod extends through the aperture of the outboard face of the housing for communicating with the brake pedal. To accomplish this, a first arm is mounted to a floorboard of the vehicle and extends rearwardly therefrom into the engine compartment. Further, a second arm of a greater length is connected to the brake pedal is slidably situated through a slot in the floorboard above the first arm. Ends of both arms are pivotally coupled to an intermediate linear member which has a bottom end pivotally coupled with respect to the plunger. Note FIGS. 4 & 5.

By this structure, the pairs of lights of increasing size and intensity are illuminated as the pedal is increasingly depressed and the plunger is extended from the housing. As is apparent from FIG. 1, two or three of the pairs of lights are illuminated at a time. Since the lights are illuminated upon communication between the plunger and the contacts being broken, it should be readily apparent that control circuitry comprising of relays or the like may be connected between the lights and the contacts in order to accomplish the intended function. Further, the length of the housing may vary such that the brake lights are illuminated as desired.

In an alternate embodiment, the spring may be de-energized and simple switches may be situated within the housing to actuate the lights when contact is broken with the plunger. Further, in the alternative, the housing may be connected to the brake pedal and the circuitry configured in a manner such that the lights are illuminated when the plunger is inserted within the housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A variable brake light system comprising, in combination:

a housing with a cylindrical configuration having an inboard face, an outboard face and a tubular periphery defining an interior space, the inboard face of the housing mounted in an engine compartment below a conventional brake pedal, the outboard face having an aperture formed therein with a tubular sleeve mounted thereon in concentric relationship therewith and extending therefrom;

a conductive coil spring mounted on the inboard face of the housing and situated within the interior space thereof, the coil spring electrically connected to a power source;

two sets of linearly aligned contacts mounted on diametrically opposed sides of the tubular periphery of the housing within the interior space thereof, each set of contacts forming a line which remains in parallel with an axis of the housing and further extends along a length thereof, each contact including a spring biased ball bearing;

a plurality of pairs of brake lights situated on a rear of the vehicle, each pair of brake lights having a unique size and intensity and connected to an associated pair of diametrically opposed contacts of the sets of contacts, wherein a size and intensity of the brake lights connected to contacts closer to the inboard face of the housing are less than that of the brake lights connected to contacts closer to the outboard face of the housing;

a conductive plunger having a cylindrical configuration slidably situated within the interior space of the housing and abutting the coil spring for receiving power therefrom, the plunger having a rod mounted to an outboard end thereof and extending through the aperture of the outboard face of the housing, the rod forming a portion of a brake actuating linkage linked to the brake pedal, the brake actuating linkage comprising a brake pedal mounted on a pedal arm, the pedal arm being mounted for permitting pivotal motion and being pivotally mounted to the rod of the plunger; and whereby the pairs of lights of increasing size and intensity are illuminated as the pedal is increasingly depressed.

2. A variable brake light system comprising:

a plurality of brake lights situated on a rear of the vehicle, each brake light having a unique size; and a plunger means forming a portion of a brake actuating linkage linked to a brake pedal, the brake actuating linkage comprising a brake pedal mounted on a pedal arm, the pedal arm being mounted for permitting pivotal motion and being pivotally mounted to the plunger means, the plunger means being for actuating the brake lights, wherein pairs of lights of increasing size are illuminated as the brake pedal is increasingly depressed:

wherein the plunger means is conductive and is adapted to connect with sets of linearly aligned contacts each of which are connected to associated brake lights.

3. A variable brake light system as set forth in claim 2 wherein the plunger means is mounted below a brake pedal.

4. A variable brake light system as set forth in claim 2 wherein the plunger means is spring biased.

5. A variable brake light system as set forth in claim 2 wherein the contacts are each spring biased.

6. A variable brake light system as set forth in claim 2 wherein the plunger means includes a plunger with arcuate ends.

7. A variable brake light system comprising:

a plurality of brake lights situated on a rear of the vehicle, each brake light having a unique size; and a plunger means forming a portion of a brake actuating linkage linked to a brake pedal, the brake actuating linkage comprising a brake pedal mounted on a pedal arm, the pedal arm being mounted for permitting pivotal motion and being pivotally mounted to the plunger means, the plunger means being for actuating the brake lights, wherein pairs of lights of increasing size are illuminated as the brake pedal is increasingly depressed;

wherein the plunger means is conductive and is adapted to connect with sets of linearly aligned contacts each of which are connected to associated brake lights;

wherein the plunger means is mounted below a brake pedal;

wherein the plunger means is spring biased;

wherein the contacts are each spring biased; and wherein the plunger means includes a plunger with arcuate ends.

* * * * *